(12) United States Patent
Kaida et al.

(10) Patent No.: US 12,399,485 B2
(45) Date of Patent: Aug. 26, 2025

(54) SERVO SYSTEM

(71) Applicant: OMRON Corporation, Kyoto (JP)

(72) Inventors: Sota Kaida, Kyoto (JP); Yasushi Ono, Kyoto (JP); Hitoshi Fukuhara, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 168 days.

(21) Appl. No.: 18/515,366

(22) Filed: Nov. 21, 2023

(65) Prior Publication Data

US 2024/0176331 A1 May 30, 2024

(30) Foreign Application Priority Data

Nov. 25, 2022 (JP) ................................. 2022-188550

(51) Int. Cl.
*G05B 19/4155* (2006.01)

(52) U.S. Cl.
CPC .............. *G05B 19/4155* (2013.01); *G05B 2219/34013* (2013.01)

(58) Field of Classification Search
CPC ...... G05B 19/4155; G05B 2219/34013; H02P 27/08; H02P 29/50; H02P 5/74
USPC .................................................. 318/629, 560
See application file for complete search history.

(56) References Cited

U.S. PATENT DOCUMENTS

| 6,259,611 | B1 | 7/2001 | Ito et al. | |
|---|---|---|---|---|
| 7,511,448 | B2 | 3/2009 | Terada et al. | |
| 8,884,561 | B2 * | 11/2014 | Furutani | H02J 7/34 |
| | | | | 318/400.26 |

FOREIGN PATENT DOCUMENTS

| JP | 2011211777 A | 10/2011 |
|---|---|---|
| JP | 6528138 B2 | 6/2019 |

OTHER PUBLICATIONS

Extended European Search Report issued in European Appln. No. 23211630.1, mailed Jun. 10, 2024.

* cited by examiner

*Primary Examiner* — David Luo
(74) *Attorney, Agent, or Firm* — ROSSI, KIMMS & McDOWELL LLP (57) ABSTRACT

A servo system including a control device and multiple servo drivers reduces noise resulting from switching. The servo system includes a control device and multiple servo drivers. Each servo driver includes a servo signal generator, a PWM calculator that generates a PWM control signal with a pulse being modulated, and an inverter. The PWM calculator performs a first process of generating, using a predetermined parameter set based on a circuit structure including the servo driver and the corresponding motor, a superimposed signal to be superimposed on the command signal, and the superimposed signal differs for each of control axes corresponding to the respective plurality of motors when the command signal is in a low voltage range. The PWM calculator performs a second process of generating the PWM control signal by adding the superimposed signal to the command signal and by comparing a resulting signal with a predetermined carrier signal.

11 Claims, 9 Drawing Sheets

FIG. 9

SERVO SYSTEM

CROSS-REFERENCE TO RELATED APPLICATION

This application claims priority to Japanese Patent Application No. 2022-188550 filed on Nov. 25, 2022, the contents of which are incorporated herein by reference.

FIELD

The present invention relates to a servo system.

BACKGROUND

Robots and equipment or machinery used at factories or other sites incorporate many motors that are used as actuators for target objects. Generally, a driver that generates a drive current for a motor based on drive commands from an upper-level control device includes an inverter to convert power with pulse width modulation (PWM) control. With PWM control, the torque output from the motor may be controlled flexibly by controlling the current flowing through each phase (e.g., a U phase, a V phase, and a W phase for a three-phase motor) in the motor to form a pseudo-sinusoidal pattern. However, various types of noise resulting from switching in the inverter occur and are to be reduced.

For example, in the structure described in Patent Literature 1, a signal unique to each control axis is superimposed on a command signal which is a target for comparison with a carrier signal in the driver when the motor is judged to be in a low drive state. This structure enables switching at different timings for each control axis in the inverter and thus reduces the likelihood that noise generated on one axis is superimposed on noise generated on another axis. Patent Literature 2 also describes a structure for superimposing a predetermined signal on a command signal in a driver and comparing the superimposed command signal with a carrier signal.

CITATION LIST

Patent Literature

Patent Literature 1: Japanese Patent No. 6528138
Patent Literature 2: Japanese Unexamined Patent Application Publication No. 2011-211777

SUMMARY

Technical Problem

A servo system including a control device and multiple servo drivers (hereafter also simply referred to as drivers) may synchronously control motors driven by each of the servo drivers. Under the circumstance that synchronous control of the multiple motors is being performed, when the switching timings in the inverters (power converters) in the drivers each corresponding to a control axis are the same or very close to one another during synchronous control of the motors, a large noise may result from each switching control.

In particular, since the switching timings are likely to be the same when the motors are in a low drive state with a low drive voltage, a technique is known to judge whether the motors are in the low drive state before superimposing signals to reduce noise. However, such a judge process relatively consumes time and thus obstructs smooth PWM control responding to changes in the drive state of the motors.

In response to the above issue, one or more aspects of the present invention are directed to a servo system including a control device and multiple servo drivers that can appropriately reduce noise resulting from switching.

Solution to Problem

A servo system according to one aspect of the present disclosure includes a control device and a plurality of servo drivers. Each of plurality of the servo drivers synchronously control a plurality of motors based on a motion command from the control device. Each of the plurality of servo drivers includes a servo signal generator that generates a command signal for a corresponding motor of the plurality of motors based on the motion command, a PWM calculator that generates, based on the command signal generated by the servo signal generator, a PWM control signal with a pulse being modulated, where PWM is pulse width modulation, and an inverter that generates a drive voltage to drive the corresponding motor by switching a switching element based on the PWM control signal generated by the PWM calculator. The PWM calculator performs a first process of generating, using a predetermined parameter set related to a circuit structure including the servo driver and the corresponding motor, a superimposed signal to be superimposed on the command signal, and the superimposed signal differs for each of control axes corresponding to the respective plurality of motors when the command signal is in a low voltage range. The PWM calculator performs a second process of generating the PWM control signal by adding the superimposed signal to the command signal and by comparing a resulting signal with a predetermined carrier signal.

In the servo system with the above structure, in each of the plurality of servo drivers, the servo signal generator generates the command signal to drive the corresponding motor in accordance with the motion command from the controller. The PWM calculator generates, based on the command signal, the PWM control signal for actually driving the inverter. The inverter generates the drive voltage to drive the corresponding motor based on the PWM control signal. The servo system includes the plurality of servo drivers that can synchronously control the respective motors. In such synchronous control, particularly when the motion of motors on the respective control axes are in a drive state with a low voltage in which the motors move simultaneously or similarly, the inverters are likely to switch at the same or similar timings, which possibly increases noise.

Each servo driver in the above servo system performs the first process and the second process with the PWM calculator. In the first process, the superimposed signal superimposed on the command signal is generated using the predetermined parameter set related to the circuit structure including the servo driver and the motor. The predetermined parameter may preferably have a different value for each control axis. The superimposed signal thus also differs for each control axis when the command signal is in the low voltage range. The predetermined parameter is set appropriately considering the electrical circuit structure including the motor and the servo driver that receives power to drive the motor, which is an electrical contributor to noise generation. The predetermined parameter may be set to any value by a user or set automatically by the servo driver. When the command signal is outside the low voltage range, noise is less likely to increase. In this case, the superimposed signal may not differ for each control axis to achieve the intended purpose of the superimposed signal. In the second process, the superimposed signal is added to the command signal and the resulting signal is compared with the predetermined carrier signal to generate the PWM control signal for driving the inverter.

The servo drivers each including the PWM calculator with the above structure allow their inverters on the control axes to switch suitably at different timings even when the command signals are in the low voltage range and noise is likely to increase. As a result, the servo system that controls the plurality of motors as control targets can appropriately reduce noise resulting from switching.

In the servo system described above, the predetermined parameter may be set in accordance with a magnitude and a duration of switching noise in the inverter. More specifically, the electrical circuit structure including the motor and the servo driver that receives power to drive the motor has a certain level of correlation with the magnitude and the duration of the switching noise. Thus, the value of the predetermined parameter is set to correspond to each control axis.

In any of the servo systems described above, the PWM calculator may perform the first process by adding a predetermined value to the superimposed signal. The predetermined value may be extracted through comparison of a value of the command signal corresponding to each phase of the corresponding motor with a value of the predetermined parameter and may be determined based on one of the values of the command signal or the value of the predetermined parameter. The predetermined value may be the value extracted through the above comparison of the magnitudes of the values, or in other words, the value itself of the command signal or the value itself of the predetermined parameter, or may be a value obtained by further processing the extracted value. The servo system with the above structure can appropriately set the superimposed signal for each control axis through comparison with the predetermined parameter, responding to determination as to whether the command signal is in the low voltage range.

More specifically, the PWM calculator will be described in more detail. In the first form, each of the plurality of motors may be a three-phase alternating current motor. The PWM calculator may extract, in the first process, at least one of a maximum value or a minimum value of the value of the command signal corresponding to each phase of the corresponding motor and the value of the predetermined parameter, and determine a value related to the extracted value as the predetermined value.

In the second form, each of the plurality of motors may be a three-phase alternating current motor. The PWM calculator may generate, in the second process, the PWM control signal using a two-phase modulation method. The PWM calculator may extract, in the first process, a maximum value or a minimum value of the value of the command signal corresponding to each phase of the corresponding motor and the value of the predetermined parameter based on a magnitude of each of an absolute maximum value and an absolute minimum value of the command signal corresponding to each phase of the corresponding motor, and set a value related to the extracted minimum value or the extracted maximum value as the predetermined value. In the third form, when the PWM calculator generates the PWM control signal using a two-phase modulation method in the second process, the PWM calculator may extract, in the first process, a maximum value or a minimum value of the value of the command signal corresponding to each phase of the corresponding motor and the value of the predetermined parameter based on a magnitude of each of an absolute maximum value and an absolute minimum value of the command signal corresponding to each phase of the corresponding motor and the predetermined parameter, and set a value related to the extracted maximum value or the extracted minimum value as the predetermined value.

In the fourth form, each of the plurality of motors may be a three-phase alternating current motor. The superimposed signal may be a third harmonic wave of the command signal corresponding to each phase of the corresponding motor. The PWM calculator may extract, in the first process, a maximum value from a value of amplitude of the command signal corresponding to each phase of the corresponding motor and the value of the predetermined parameter, and set a value related to the extracted maximum value as the predetermined value included in the third harmonic wave.

The above four forms are merely examples. The PWM calculator may be implemented in other forms.

In any of the servo systems described above, the predetermined parameter may have a fixed value that is invariable over time or a variable value that is variable over time. In other words, the servo system may set the predetermined parameter flexibly. A value of the predetermined parameter may be automatically determined based on electrical circuit structures including the plurality of servo drivers and the plurality of motors connected to the control device. The predetermined parameter is set automatically so as to effectively reduce noise and greatly increase the user convenience.

Advantageous Effects

The servo system including the control device and the multiple servo drivers can appropriately reduce noise resulting from switching.

DETAILED DESCRIPTION

Figure 1:
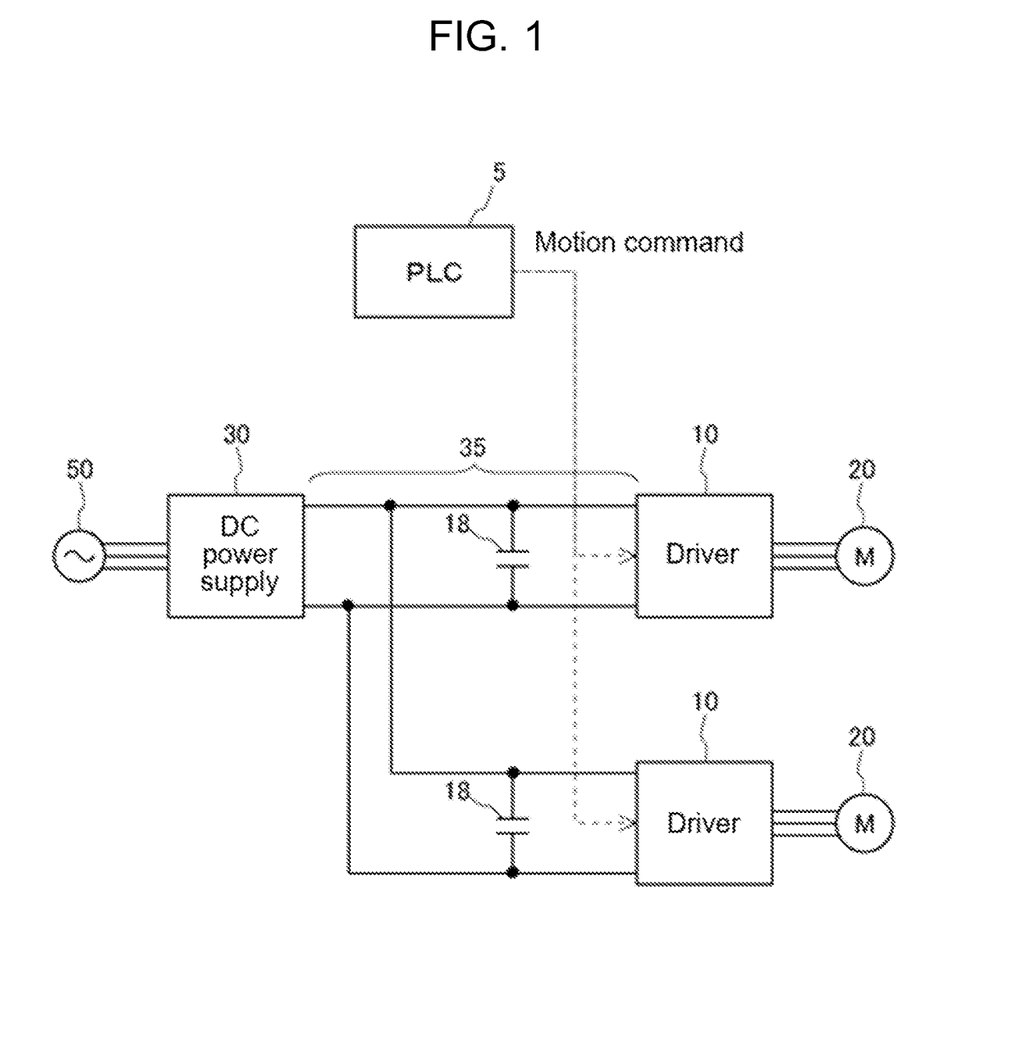
FIG. 1 is a schematic diagram of a servo system according to an embodiment of the present disclosure.
Figure 2:
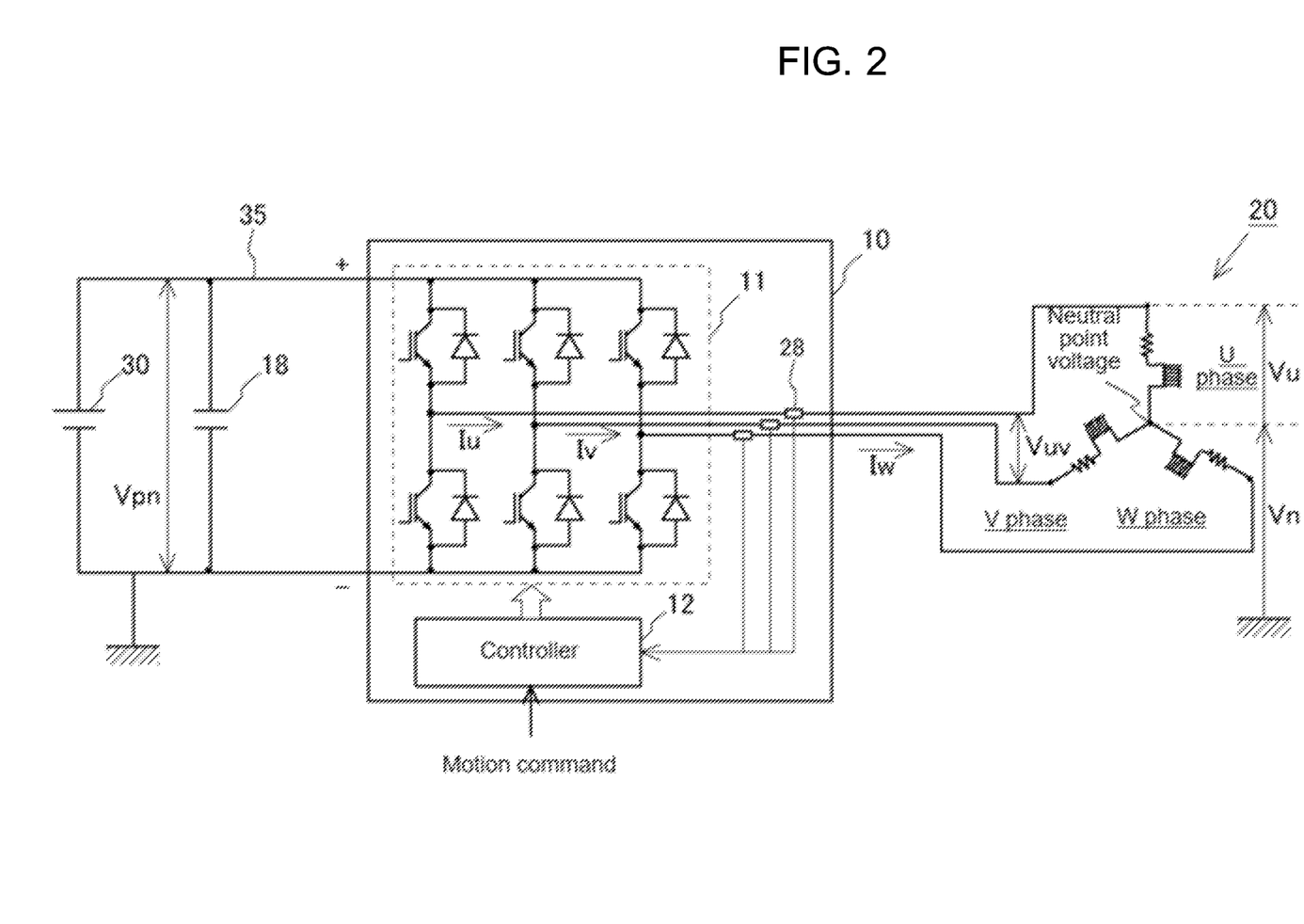
FIG. 2 is a schematic diagram of a driver included in the servo system in FIG. 1, showing its electrical configuration.

Embodiments of the present invention will now be described with reference to the drawings. FIG. 1 is a schematic diagram of a servo system according to an embodiment of the present invention. FIG. 2 is a schematic diagram of a driver 10 included in the servo system, showing its electrical configuration.

First Embodiment

As shown in FIG. 1, the servo system according to the present embodiment includes a programmable logic controller (PLC) 5 as an upper-level control device and multiple drivers 10. Each driver 10 is connected to its control target, which is a motor 20. Each single control axis includes a single driver 10 and a single motor 20 corresponding to the driver 10. In the servo system shown in FIG. 1, the PLC 5 transmits, to the driver 10 on each control axis, a motion command corresponding to the driver 10. Each driver 10 generates a drive voltage to drive the corresponding motor 20 based on the motion command.

The servo system includes a direct current (DC) power supply 30 and the multiple drivers 10 connected with a power supply path 35. The DC power supply 30 outputs a predetermined DC voltage. The DC power supply 30 may convert a three-phase alternating current (AC) from a three-phase AC power supply 50 to a DC voltage or may convert a single-phase AC to a DC voltage. In another embodiment, the DC power supply 30 may be a rectifier circuit including diodes (e.g., a full-wave rectifier circuit) or an AC-DC converter including a switching element (e.g., a power regeneration converter). The system may include DC power supplies 30 each connected to the driver 10 on the corresponding axis, in place of the structure shown in FIG. 1. The power supply path 35 may be connected to a secondary battery.

As shown in FIG. 2, each driver 10 includes an inverter 11 and a controller 12. The inverter 11 converts a DC voltage input from the DC power supply 30 through the power supply path 35 into a three-phase AC. The inverter 11 includes, between a positive power line and a negative power line, a U-phase leg, a V-phase leg, and a W-phase leg connected in parallel to one another. The driver 10 includes current sensors 28 that measure currents output from the respective legs in the inverter 11.

The controller 12 performs pulse width modulation (PWM) control on the inverter 11 to perform servo control on the motor 20 in response to a motion command from the PLC 5. The controller 12 includes a processor such as a microcontroller or a central processing unit (CPU) and peripheral circuits of the processor. The controller 12 receives, for example, signals from each current sensor 28 and signals from an encoder 21 (an absolute encoder or an incremental encoder, refer to FIG. 3) attached to the motor 20.

As shown in FIG. 1, the power supply path 35 includes multiple power cables to supply and distribute power (current) from the DC power supply 30 to each driver 10 in the servo system. The power supply path 35 usually includes smoothing capacitors 18 at its connections to the respective drivers 10 (between the power terminals of each driver 10).

A phase voltage, a line voltage, and a neutral point voltage in the driver 10 or the motor 20 in this application are defined as described below with reference to FIG. 2. A neutral point is a connection point connecting phases (U, V, and W phases) in the motor 20 with a three-phase winding. The phase voltage is the voltage of each phase with reference to the neutral point, and the phase voltages of the U phase, the V phase, and the W phase are indicated as Vu, Vv, and Vw. The line voltage is the voltage between two phases with reference to the other phase, and the line voltages between the U phase and the V phase, between the V phase and the W phase, and between the W phase and the U phase are indicated as Vuv, Vvw, and Vwu. The neutral point voltage is the voltage with reference to a negative potential being grounded at the neutral point and is indicated as VNN. Further, the voltage across the positive power line and the negative power line in the power supply path 35 is indicated as a PN voltage Vpn.

Figure 3:
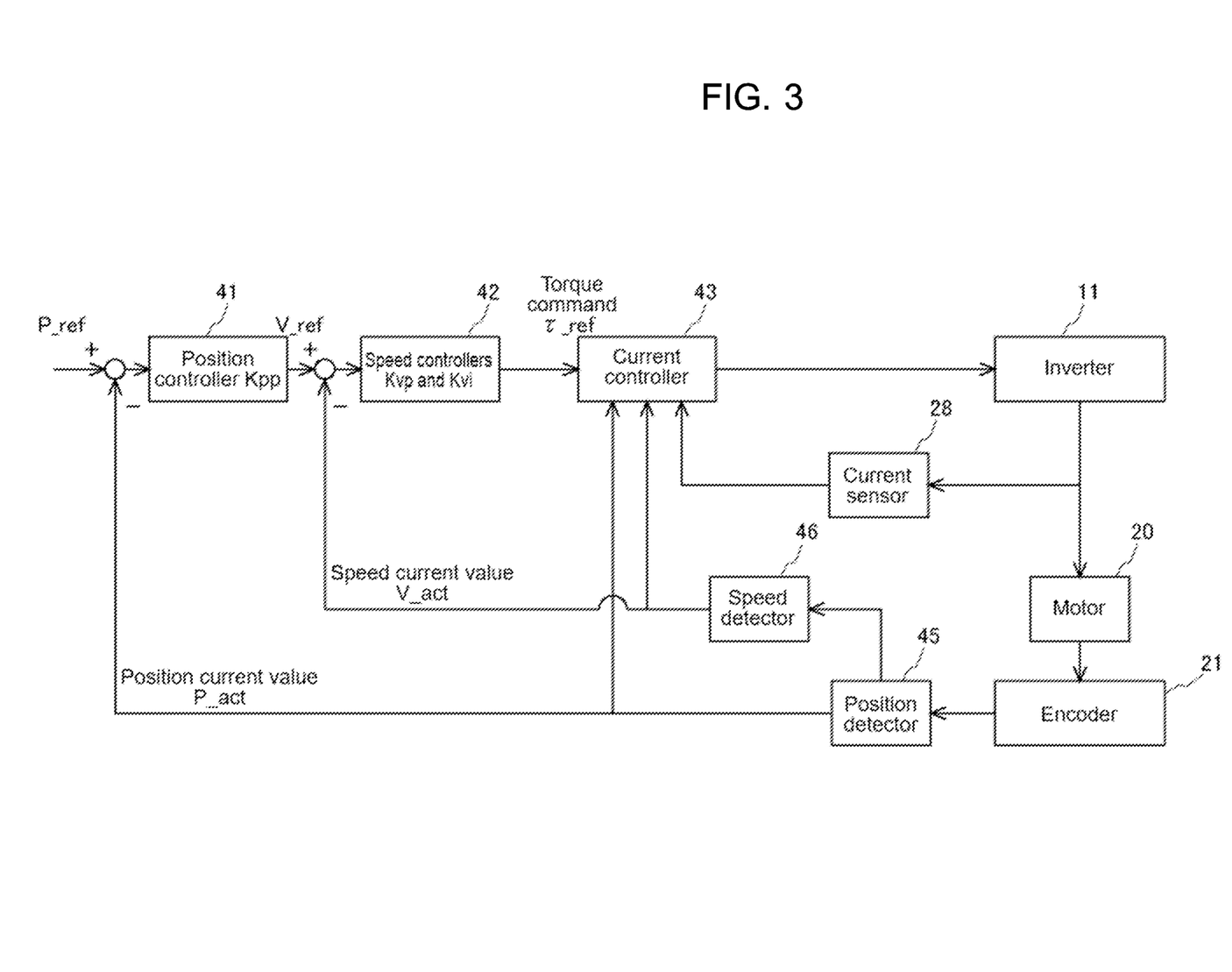
FIG. 3 is a control block diagram of a feedback unit included in the driver in the embodiment of the present disclosure.

The control structure of a feedback unit included in the controller 12 in the driver 10 will be described with reference to FIG. 3. The feedback unit in the controller 12 includes a position controller 41, a speed controller 42, and a current controller 43. The feedback unit corresponds to a servo signal generator in an embodiment of the present disclosure. The position controller 41 performs, for example, proportional control (P control). More specifically, a speed command V_ref is calculated by multiplying a position deviation between a position command P_ref from the PLC 5 and a position current value P_act of the motor 20 by a predetermined position proportional gain. The position current value P_act is a parameter indicating the current position of the motor 20, and the position current value P_act is obtained by inputting a signal output by the encoder 21 into a position detector 45.

The speed controller 42 performs, for example, proportional-integral control (PI control). More specifically, a torque command τ_ref is calculated by multiplying, an integral of a speed deviation which is a deviation between the speed command V_ref calculated by the position controller 41 and a speed current value V_act of the motor 20, by a predetermined speed integral gain, and then multiplying the sum of the resulting value and the speed deviation by a predetermined speed proportional gain. The speed controller 42 may perform P control, in place of PI control. The speed current value V_act is a parameter indicating the current speed of the motor 20, which is obtained by inputting a signal output by the position detector 45 into a speed detector 46.

The current controller 43 generates a current command based on the torque command τ_ref calculated by the speed controller 42, the position current value P_act and the speed current value V_act of the motor 20, and a drive current supplied to the motor 20 from the inverter 11. Based on the current command, the current controller 43 then outputs, to the inverter 11, a voltage command (PWM control signal) corresponding for each phase in a three-phase AC motor. The inverter 11 receiving the voltage command applies a drive voltage to each phase (U, V, and W phases) in the motor 20 through PWM control to drive and control the motor 20. The current sensors 28 each detect the drive current supplied to the motor 20. Although FIG. 3 shows the structure corresponding to each phase in the motor 20 in a simplified manner, each current sensor 28 detects a current flowing to a winding of the corresponding phase in the motor 20 and returns the current value for the corresponding phase to the current controller 43. The current controller 43 may include a filter (primary low-pass filter) or one or more notch filters for the torque command.

Figure 4:
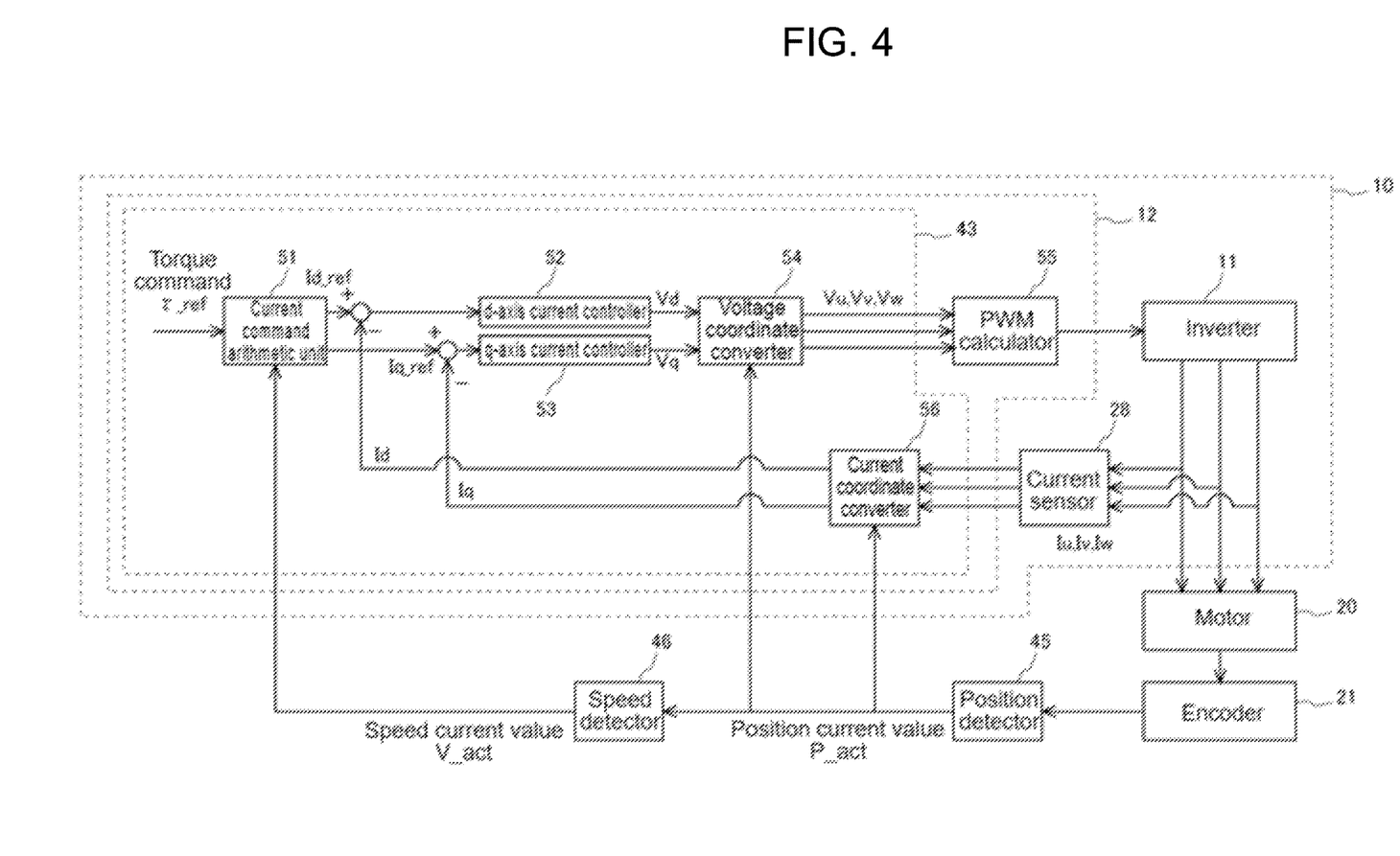
FIG. 4 is a control block diagram of the driver in the embodiment of the present disclosure for performing current control.

The control structure for controlling a current, including the current controller 43, will now be described with reference to FIG. 4. The current controller 43 performs vector control. The torque command τ_ref received by the current controller 43 is first input into a current command arithmetic unit 51. The speed current value V_act of the motor 20 is further input into the current command arithmetic unit 51 to generate a d-axis current command Id_ref and a q-axis current command Iq_ref. A deviation between the d-axis current command Id_ref and a d-axis current Id currently flowing in the motor 20 is input into a d-axis current controller 52. A deviation between the q-axis current command Iq_ref and a q-axis current Iq currently flowing in the motor 20 is input into a q-axis current controller 53. The d-axis current Id and the q-axis current Iq currently flowing in the motor 20 are calculated by inputting currents Iu, Iv, and Iq flowing through the U, V, and W phases in the motor 20 detected by the current sensors 28 into a current coordinate converter 56 and performing a dq conversion process in the current coordinate converter 56.

The d-axis current controller 52 calculates a voltage command Vd on a d-axis from the input deviation on the d-axis current based on the physical property parameters of the motor 20. Similarly, the q-axis current controller 53 calculates a voltage command Vq on a q-axis from the input deviation on the q-axis current based on the physical property parameters of the motor 20. The calculated voltage commands Vd and Vq are input into a voltage coordinate converter 54. The voltage coordinate converter 54 converts the input voltage commands on the d-axis and the q-axis from the dq axis voltage to the three-phase voltage, and generates the voltage commands Vu, Vv, and Vw for the voltages applied to the respective phases in the motor 20. These voltage commands are transmitted to a PWM calculator 55. The PWM calculator 55 generates, based on the voltage commands, pulse-modulated PWM control signals as commands to be output to the inverter 11 and transmits the control signals to the inverter 11.

The PWM calculator 55 changes and redefines the neutral point voltage to effectively use the PN voltage Vpn and to increase the drive efficiency of the motor 20, and performs a first process for generating a superimposed signal including the redefined neutral point voltage VNN. Further, the PWM calculator 55 performs a second process for generating PWM control signals to activate the legs for each phase in the inverter 11 by adding the superimposed signal which is generated in the first process to the above voltage commands, and comparing it with a predetermined carrier signal in the inverter 11.

In the first process, the redefined neutral point voltage VNN is expressed by Formula 1 below.

$$V_{NN} = \frac{1}{2}\{\max(Vu, Vv, Vw) + \min(Vu, Vv, Vw)\} \quad (1)$$

The function max in Formula 1 is a function to extract the maximum value from multiple arguments. The function min is a function to extract the minimum value from multiple arguments. The neutral point voltage VNN changes when the neutral point voltage is redefined using these functions. The above phase voltages Vu, Vv, and Vw are each a value of the voltage command for the corresponding phase calculated by the current controller 43 (refer to FIG. 4). The phase voltages may be hereafter simply referred as command signals or the voltage commands.

The neutral point voltage VNN expressed by Formula 1 and the PN voltage Vpn are combined as a superimposed signal. Further, the superimposed signal is added to the voltage commands Vu, Vv, and Vw for the phases to generate new voltage commands for the phases VsuN, VsvN, and VswN. More specifically, the redefined neutral point voltage VNN is subtracted from the voltage commands for the phases, and a median value of the PN voltage Vpn is added to the resulting values to generate new voltage commands. The new voltage commands are expressed by Formula 2 below.

$$V_{suN} = V_u - V_{NN} + \frac{1}{2}V_{pn} \quad (2)$$

$$V_{svN} = V_v - V_{NN} + \frac{1}{2}V_{pn}$$

$$V_{swN} = V_w - V_{NN} + \frac{1}{2}V_{pn}$$

The trends of the phase voltages and the line voltage in the inverter 11 in the first process for generating a superimposed signal will be described with reference to FIG. 5. The trends of the phase voltages and the line voltage shown in the upper part of FIG. 5 corresponds to the state before the neutral point voltage is redefined, or specifically, when the neutral point voltage is fixed. In this state, the phase voltage of each phase has an amplitude W1 matching the amplitude of the PN voltage Vpn. while the line voltage has an amplitude W10 that does not match an amplitude W11 corresponding to the amplitude of the PN voltage Vpn.

Figure 5:
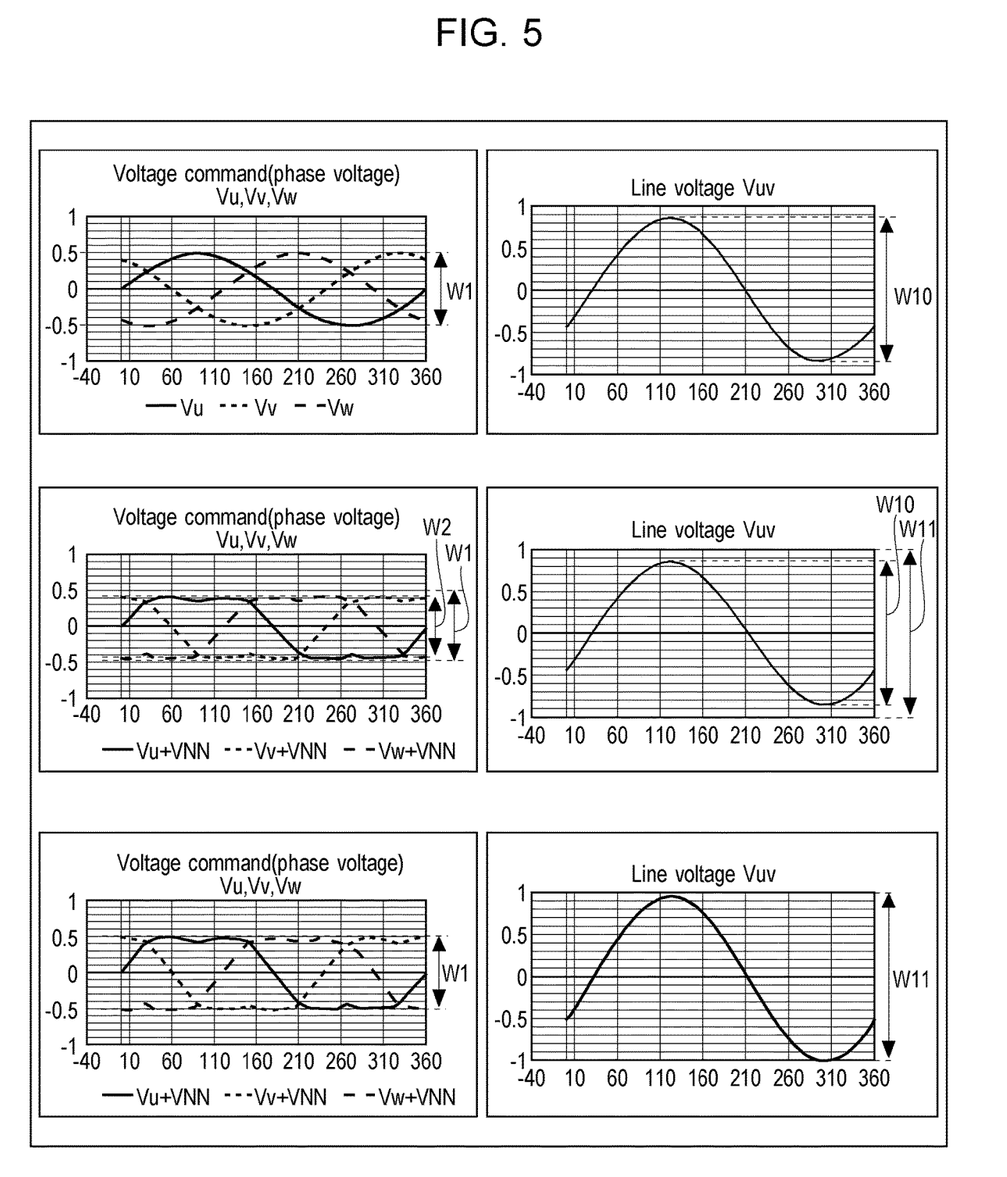
FIG. 5 is a diagram describing the trends of phase voltages and a line voltage in an inverter included in the driver.

The middle part of FIG. 5 shows the trends of the phase voltages and the line voltage corresponding to the newly generated voltage commands as expressed by Formula 2 above. The phase voltage of each phase has an amplitude W2 that is smaller than the amplitude W1 described above. However, the amplitude of the line voltage is the same as the amplitude W10 in the upper part and does not match the amplitude W11 corresponding to the amplitude of the PN voltage Vpn. The amplitude W2 of the phase voltage of each phase is thus multiplied by a predetermined factor (specifically, 3 times 2/sqrt) and amplified to match the amplitude W1. As shown in the lower part of FIG. 5, the amplitude of the phase voltage of each phase matches the amplitude W1 corresponding to the amplitude of the PN voltage Vpn, and the amplitude of the line voltage also matches the amplitude W11 corresponding to the amplitude of the PN voltage Vpn. In the state shown in the lower part of FIG. 5, generation of the drive voltage to drive the motor 20 by the inverter 11 can be realized by effectively utilizing he PN voltage.

Figure 6:
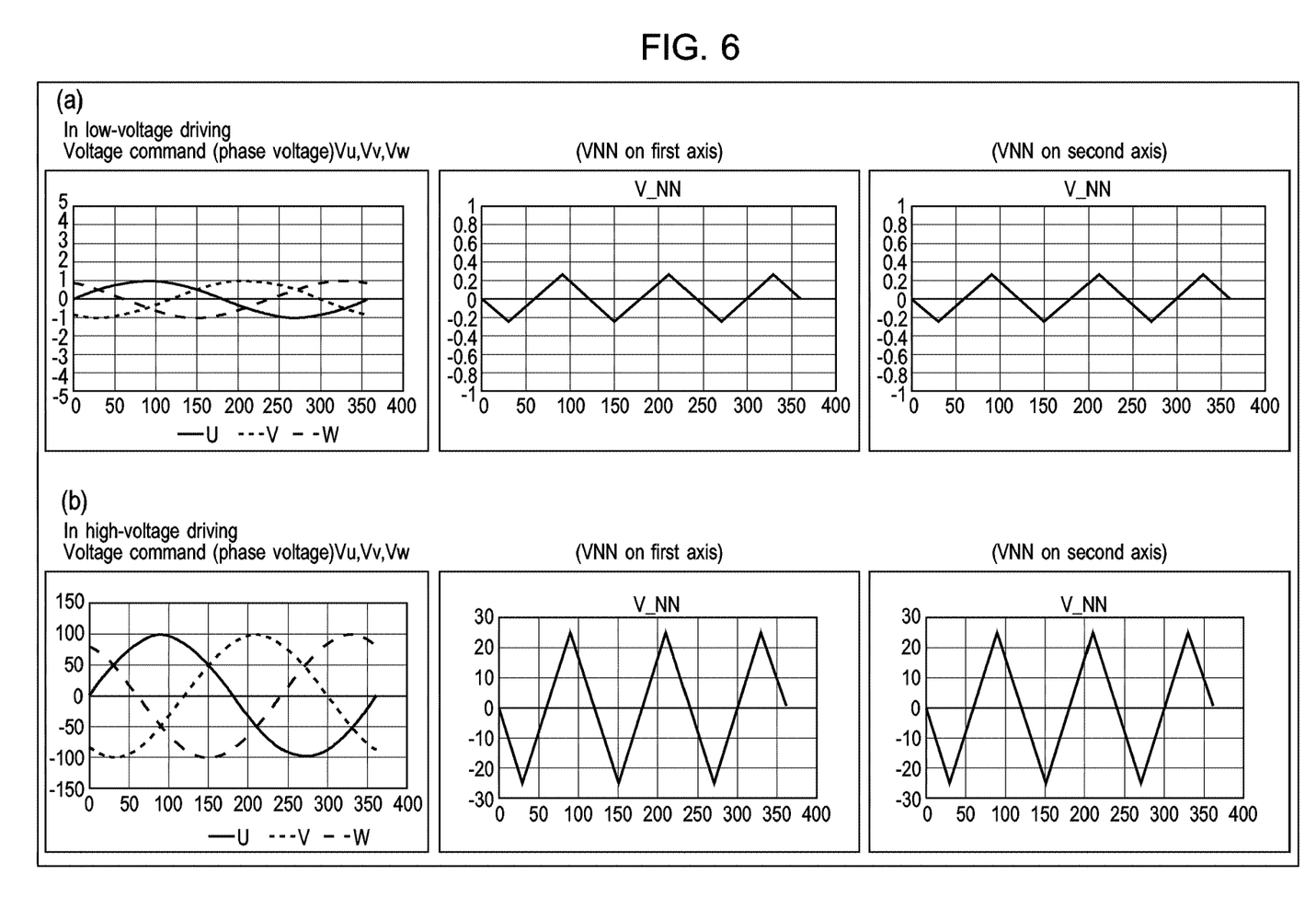
FIG. 6 is a first diagram showing the trends of the phase voltages in inverters and the trends of neutral point voltages on two different control axes when command signals to motors driven by drivers have a high voltage and a low voltage.

However, when new voltage commands are generated as described above and when the voltage commands are small such that the voltage commands of each phase are substantially the same (e.g., a servo-locked state in which the output shaft of the motor 20 is stopped by servo control), the legs for the phases in the inverter 11 switch at the same or highly similar timings. Further, when the control axes in the servo system shown in FIG. 1 are under synchronous control, the legs for the phases in the inverters 11 on the control axes switch at the same or highly similar timings between the control axes. The upper part (a) of FIG. 6 shows, side by side, the trends of the phase voltage of each phase and the neutral point voltages VNN on two control axes under synchronous control in low-voltage driving with low initial voltage commands. The lower part (b) of FIG. 6 shows, side by side, the trends of the phase voltage of each phase and the neutral point voltages VNN on the two control axes under synchronous control in high-voltage driving with high initial voltage commands. As shown in the figure, the neutral point voltages on the two control axes under synchronous control have substantially the same trend. Based on Formula 2, the trends of the newly generated voltage commands are to be substantially the same. As a result, noise resulting from switching on one of the axes and noise resulting from switching on the other axis overlap each other and increase adverse effects, which is undesirable.

In one or more embodiments of the present disclosure, a further technique is used to generate a superimposed signal that is superimposed on the initial voltage commands. The technique focuses on switching that tends to overlap when the voltage commands are relatively small. In other words, the technique is used to generate the superimposed signal to allow the trends of the neutral point voltages VNN on control axes under synchronous control to be different in low-voltage driving and the trends of the neutral point voltages VNN on the control axes to be substantially the same in high-voltage driving. The technique will be described in detail below.

In the present embodiment, the PWM calculator 55 generates PWM control signals with a known three-phase modulation method. With this technique, the neutral point voltage VNN is redefined as expressed by Formula 3 below, in place of Formula 1 above.

$$V_{NN} = \frac{1}{2}\{\max(Vu, Vv, Vw, C_+) + \min(Vu, Vv, Vw, C_-)\} \quad (3)$$

The neutral point voltage VNN expressed by Formula 3 differs from the neutral point voltage expressed by Formula 1 in that a predetermined parameter C+ (C−), which largely relates to the electrical circuit structure including the driver 10 and the motor 20, in other words, the circuit structure reflecting electrical factors for noise resulting from switching in the inverter 11 in the driver 10, is included in Formula 3. C+ indicates a predetermined parameter set by the function max. C− indicates a predetermined parameter set by the function min. The two predetermined parameters are technically set based on the noise resulting from switching as described above. More specifically, the predetermined parameters are set based on the magnitude and the duration of the switching noise in the inverter 11. As described later, the trend of the neutral point voltage VNN varies depending on the value of the predetermined parameter C+ (C−) and the magnitudes of the voltage commands. The predetermined parameters may be set appropriately to avoid overlapping of the expected switching noise between the control axes as much as possible. The predetermined parameters C+ and C− have the same technical meaning. However, the parameters have different values based on the characteristics of the two functions. Further, it is preferable that the predetermined parameters C+ and C− differ from each other between the control axes.

Formula 3 will now be described in detail. The function max is to extract the maximum value from four elements being the voltage commands Vu, Vv, and Vw and C+. The function min is to extract the minimum value from the four elements. When the voltage commands are in a relatively low voltage range (more specifically, in low-voltage driving described above), the amplitude values of the voltage commands Vu, Vv, and Vw are relatively small. Thus, the predetermined parameter C+ is relatively larger than the other elements Vu, Vv, and Vw at the positive voltage, and the predetermined parameter C− is relatively smaller than the other elements Vu, Vv, and Vw at the negative voltage. Therefore, the function max extracts the predetermined parameter C+. The function min extracts the predetermined parameter C−. In contrast, when the voltage commands are in a relatively high-voltage range (more specifically, in high-voltage driving described above), the amplitude values of the voltage commands Vu, Vv, and Vw are relatively large, and Vu, Vv, and Vw are relatively larger than the predetermined parameter C+ at the positive voltage and relatively smaller than the predetermined parameter C− at the negative voltage. Therefore, the function min extracts the positive amplitude value of one of Vu, Vv, or Vw. The function min extracts the negative amplitude value of one of Vu, Vv, or Vw.

Figure 7:
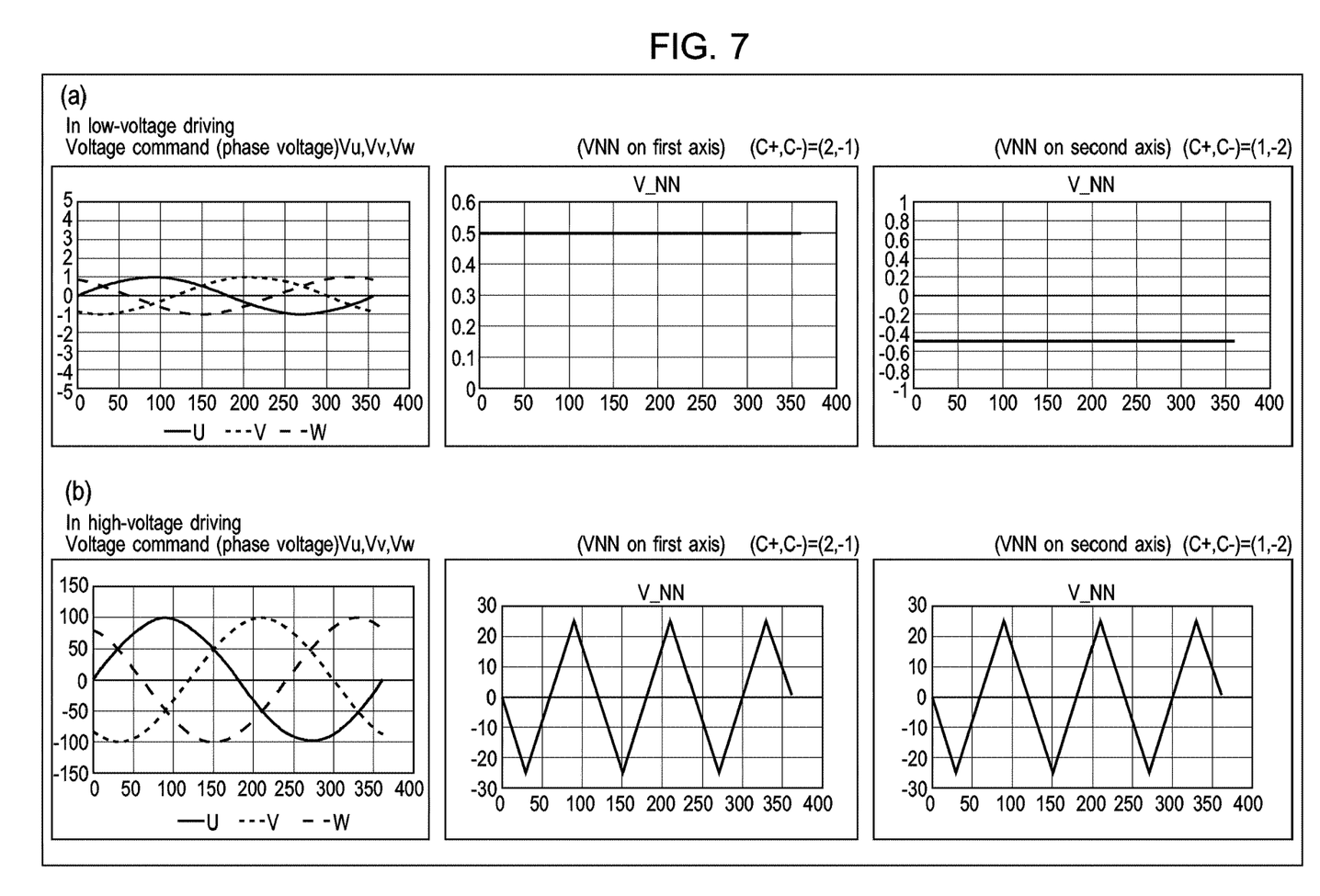
FIG. 7 is a second diagram showing the trends of the phase voltages in the inverters and the trends of the neutral point voltages on the two different control axes when the command signals to the motors driven by the drivers have a high voltage and a low voltage.

FIG. 7 shows the trends of the voltage commands and the neutral point voltages VNN when the neutral point voltages VNN are calculated using Formula 3 for the two control axes under synchronous control in the servo system. The upper part (a) of FIG. 7 shows, side by side, when driving with low initial voltage commands, the trends of the phase voltage of each phase and the neutral point voltages VNN on the two control axes under synchronous control in low-voltage. The lower part (b) shows, side by side, when driving with high initial voltage commands, the trends of the phase voltage of each phase and the neutral point voltages VNN on the two control axes under synchronous control in high-voltage. The value of the predetermined parameter C+ is 2 and the value of the predetermined parameter C− is −1 for one of the control axes. The value of the predetermined parameter C+ is 1 and the value of the predetermined parameter C− is −2 for the other control axis. As show in the figure, the neutral point voltages on the two control axes under synchronous control have different trends in low-voltage driving and substantially the same trends in high-voltage driving.

Figure 8:
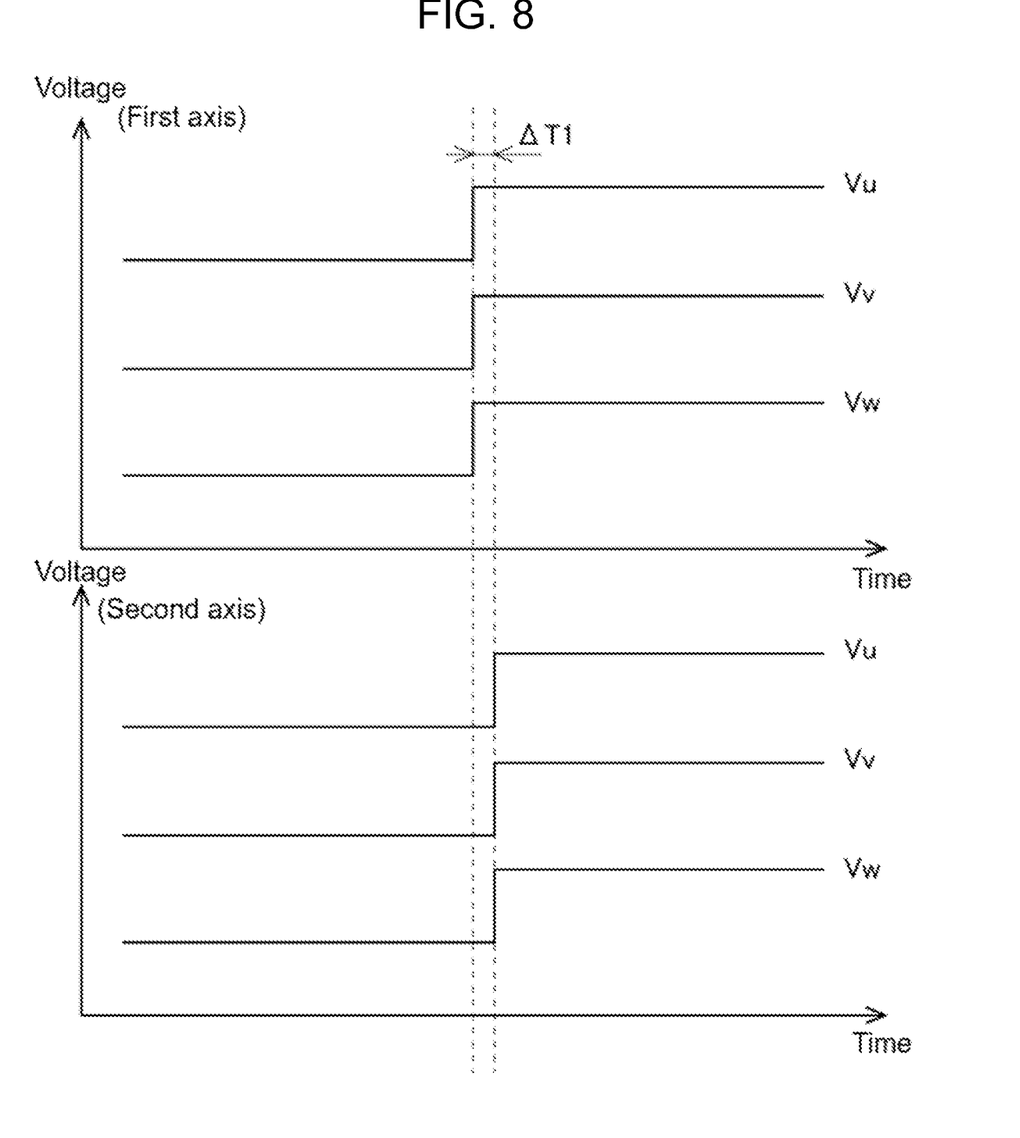
FIG. 8 is a diagram showing the situation of switching in each phase in inverters on the two different control axes when the command signal corresponding to FIG. 7 has a low voltage.

In low-voltage driving, the neutral point voltage VNN differs on each control axis and the trend of the superimposed signal that is superimposed on the initial voltage commands thus differs between the control axes. The new voltage commands expressed by Formula 2 thus differ between the control axes. The resulting voltage trends of the phases in the PWM control signals for the inverter 11 on the two control axes are shown in FIG. 8. In low-voltage driving, for example, in the servo-locked state, the switching timings in the phases on each control axis are the same. However, the neutral point voltage VNN differs on each control axis as shown in the upper part (a) of FIG. 7, and the switching timings can be shifted by ΔT1 between the control axes. The ΔT1 is the time to appropriately avoid overlapping of noise generated on each axis. The ΔT1 is obtained by setting the predetermined parameters C+ and C− as described above.

Figure 9:
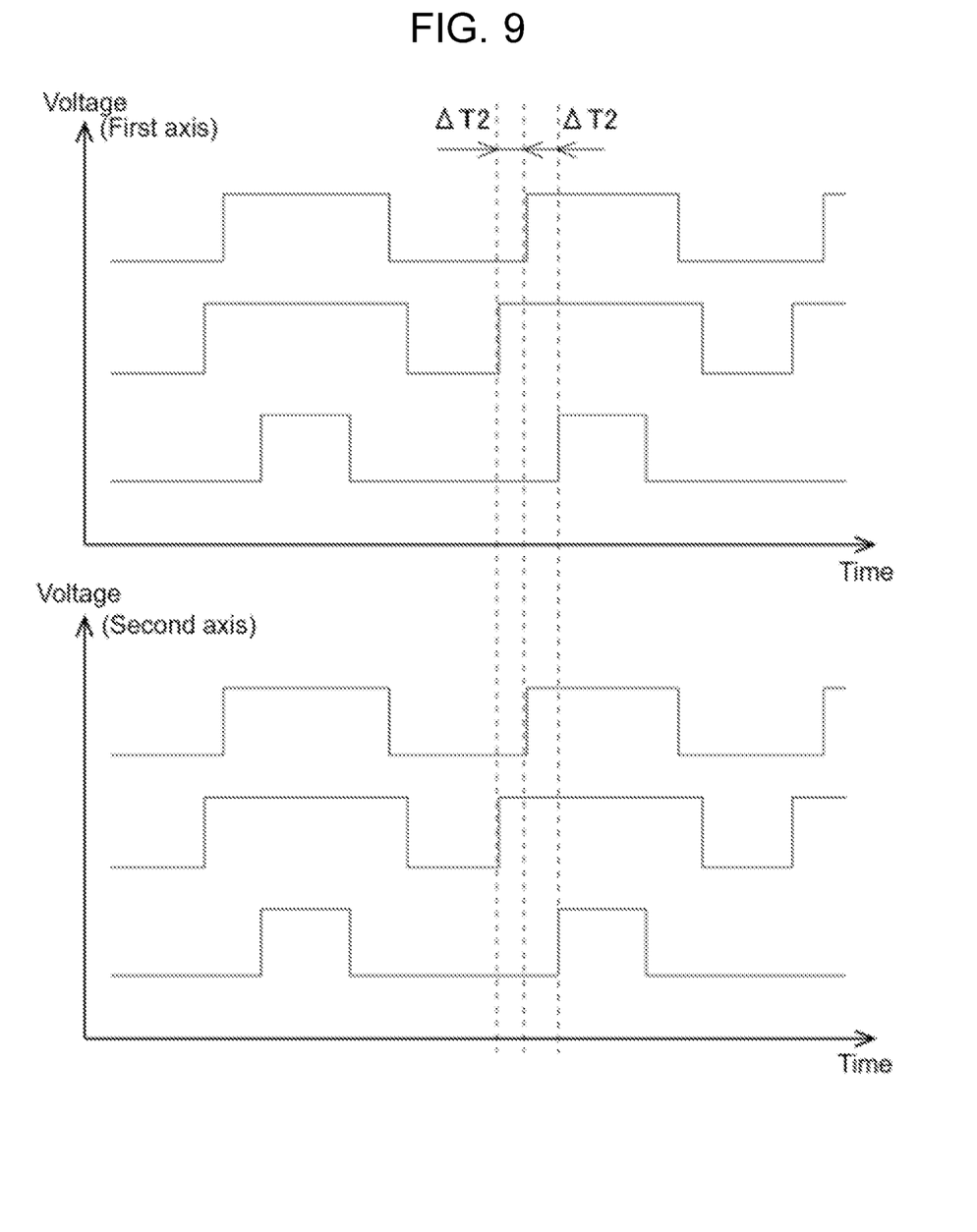
FIG. 9 is a diagram showing the situation of switching in each phase in the inverters on the two different control axes when the command signal corresponding to FIG. 7 has a high voltage.

In high-voltage driving, the neutral point voltage VNN does not differ on each control axis and is substantially the same. The new voltage commands expressed by Formula 2 are thus also substantially the same between the control axes. The resulting voltage trends of the phases in the PWM control signals for the inverter 11 on the two control axes are shown in FIG. 9. In high-voltage driving, the motors rotate at a predetermined speed, and the switching timings of the phases on each control axis are shifted by ΔT2 as shown in FIG. 9. Even when the new voltage commands are substantially the same between the control axes, the switching timings in the inverters 11 in the servo system are distributed to some extent, thus eliminating the effects of the overlapping switching noise.

The neutral point voltage VNN is redefined based on Formula 3 to generate a superimposed signal appropriate for the high or low drive voltage, and to generate new command signals to which the superimposed signal is added, without judging the voltage range based on the voltage commands, or specifically, without judging whether the system is in low-voltage driving with more effects resulting from the overlapping switching noise. In the servo system, the motors 20 can be synchronously controlled while the switching noise caused by the multiple inverters 11 is reduced appropriately. As described with reference to FIG. 5, the PN voltage Vpn is effectively used to apply a voltage to each motor 20.

The predetermined parameters C+ and C− for each control axis may have fixed values that are invariable over time or variable values that are variable over time. It is most preferable that the predetermined parameters C+ and C− are set not to match between the control axes or to match for as much as a short period of time to reduce the switching noise. The predetermined parameters C+ and C− for each control axis may be automatically calculated by, for example, the PLC 5, based on the electrical circuit structure including the multiple drivers 10 and the multiple motors 20 in the servo system and transmitted to the controller 12 in each driver 10. The servo system can be easily configured with this configuration and thus can improve the user convenience.

Second Embodiment

In a second embodiment, redefining the neutral point voltage VNN will be described below. In the present embodiment, the PWM calculator 55 generates PWM control signals with a known two-phase modulation method (in particular, a method using upper and lower arms). The two-phase modulation method reduces the number of times of switching in the inverters 11 and thus reduces the switching loss. In the second embodiment, the neutral point voltage VNN is redefined as expressed by Formula 4 below, in place of Formula 1 above.

$V_{NN}=1-\max(V_u, V_v, V_w, C)$ when $|\max(V_u, V_v, V_w)| \geq |\min(V_u, V_v, V_w)|$ $V_{NN}=-1-\min(V_u, V_v, V_w, -C)$ when $|\max(V_u, V_v, V_w)| < |\min(V_u, V_v, V_w)|$ (4)

For the neutral point voltage VNN expressed by Formula 4, a predetermined parameter C, which largely relates to the electrical circuit structure including the driver 10 and the motor 20, or specifically, the circuit structure reflecting electrical factors for noise resulting from switching in the inverter 11 in the driver 10, is also included in Formula 4 as with Formula 3. The predetermined parameter C is also set based on the magnitude and the duration of the switching noise in the inverter 11. In the present embodiment, the predetermined parameter has a positive value (C>0) that differs for each control axis.

Based on Formula 4, the absolute value of the maximum value of the voltage commands of the phases is compared with the absolute value of the minimum value of the voltage commands of the phases. When the absolute value of the maximum value is greater than or equal to the absolute value of the minimum value, the neutral point voltage VNN is the value obtained by subtracting the maximum value of the four elements being the voltage commands Vu, Vv, and Vw and C that is extracted by the function max from the positive amplitude value of the PN voltage Vpn (1 in Formula 4). When the absolute value of the minimum value of the voltage commands of the phases is greater than the absolute value of the maximum value, the neutral point voltage VNN is the value obtained by subtracting the minimum value of the four elements being the voltage commands Vu, Vv and Vw and C− that is extracted by the function min from the negative amplitude value of the PN voltage Vpn (−1 in Formula 4). In low-voltage driving, even if the neutral point voltage VNN was redefined, the neutral point voltage VNN in this manner differs for each control axis and the trends of the superimposed signal that is superimposed on the initial voltage commands differ between the control axes as with Formula 3. The new voltage commands expressed in Formula 2 thus differ between the control axes. In high-voltage driving, as with Formula 3, the new voltage commands can match substantially between the control axes, thus the initial benefit of driving the motors by the two-phase modulation method can be enjoyed Third Embodiment In a third embodiment, redefining the neutral point voltage VNN will be described below. In the present embodiment as well, the PWM calculator 55 generates PWM control signals with the known two-phase modulation method (in particular, the method using upper and lower arms). In the third embodiment, the neutral point voltage VNN is redefined as expressed by Formula 5 below, in place of Formula 1 above.

$V_{NN}=1-\max(V_u, V_v, V_w, C)$ when $|\max(V_u, V_v, V_w, C)| \geq |\min(V_u, V_v, V_w, C)|$ $V_{NN}=-1-\min(V_u, V_v, V_w, C)$ when $|\max(V_u, V_v, V_w, C)| < |\min(V_u, V_v, V_w, C)|$ (5)

For the neutral point voltage VNN expressed by Formula 5, a predetermined parameter C, which largely relates to the electrical circuit structure including the driver 10 and the motor 20, or specifically, the circuit structure reflecting electrical factors for noise resulting from switching in the inverter 11 in the driver 10, is included in Formula 5 as with Formula 3. The predetermined parameter C is also set based on the magnitude and the duration of the switching noise in the inverter 11. In the present embodiment, the predetermined parameter has a positive value (C>0) that differs for each control axis.

Based on Formula 5, the absolute values of the maximum value of the voltage commands of the phases and the predetermined parameter C is compared with the absolute value of the minimum value of the voltage commands of the phases and the predetermined parameter C. When the absolute value of the maximum value is greater than or equal to the absolute value of the minimum value, the neutral point voltage VNN is the value obtained by subtracting the maximum value of the four elements being the voltage commands Vu, Vv, and Vw and C that is extracted by the function max from the positive amplitude value of the PN voltage Vpn (1 in Formula 5). When the absolute value of the minimum value is greater than the absolute value of the maximum value, the neutral point voltage VNN is the value obtained by subtracting the minimum value of the four elements being the voltage commands Vu, Vv, and Vw and C that is extracted by the function min from the negative amplitude value of the PN voltage Vpn (−1 in Formula 5). In low-voltage driving, even the neutral point voltage VNN redefined in this manner, the neutral point voltage VNN differs for each control axis and the trends of the superimposed signal that is superimposed on the initial voltage commands differ between the control axes as with Formula 3. The new voltage commands expressed in Formula 2 thus differ between the control axes. In high-voltage driving, as with Formula 3, the new voltage commands can match substantially between the control axes, thus the initial benefit of driving the motors by the two-phase modulation method can be enjoyed Fourth Embodiment In a fourth embodiment, redefining the neutral point voltage VNN will be described below. In the present embodiment as well, the PWM calculator 55 generates PWM control signals with the known three-phase modulation method. In the fourth embodiment, the neutral point voltage VNN is redefined as expressed by Formula 6 below, in place of Formula 1 above.

$$V_{NN} = \frac{1}{6}\max(k, C)\sin(3\omega t) \quad (6)$$

In Formula 6, ω is the frequency of the voltage commands Vu, Vv, and Vw, and k is the amplitude of the voltage commands.

The neutral point voltage VNN expressed by Formula 6 indicates the voltage commands Vu, Vv, and Vw with a transformed third harmonic wave. The neutral point voltage VNN associated with the third harmonic wave is superimposed on the initial voltage command for the PN voltage Vpn to be used effectively for voltage application. For this neutral point voltage VNN, a predetermined parameter C, which largely relates to the electrical circuit structure including the driver 10 and the motor 20, or specifically, the circuit structure reflecting electrical factors for noise resulting from switching in the inverter 11 in the driver 10, is included in Formula 6 as with Formula 3. The predetermined parameter C is also set based on the magnitude and the duration of the switching noise in the inverter 11. In the present embodiment, the predetermined parameter has a positive value (C>0) that differs for each control axis.

Based on Formula 6, the amplitude of the superimposed signal is affected by the extraction result returned from the function max. The function max in Formula 6 is a function that extracts the maximum value of the amplitude k of the voltage commands and the predetermined parameter C. In low-voltage driving, the neutral point voltage VNN redefined based on Formula 6 differs for each control axis and the trends of the superimposed signal that is superimposed on the initial voltage commands differ between the control axes as with Formula 3. The new voltage commands expressed in Formula 2 thus differ between the control axes. In high-voltage driving, as with Formula 3, the new voltage commands can match substantially between the control axes, thus the initial benefit of driving the motors by superimposing the third harmonic wave can be enjoyed.

Appendix 1

A servo system, comprising:
a control device (5); and
a plurality of servo drivers (10) configured to synchronously control a plurality of motors (20) based on a motion command from the control device (5), each of the plurality of servo drivers (10) including
a servo signal generator configured to generate a command signal for a corresponding motor (20) of the plurality of motors (20) based on the motion command,
a PWM calculator (55) configured to generate, based on the command signal generated by the servo signal generator, a PWM control signal with a pulse being modulated, where PWM is pulse width modulation, and
an inverter (11) configured to generate a drive voltage to drive the corresponding motor by switching a switching element based on the PWM control signal generated by the PWM calculator (55),
wherein the PWM calculator (55) performs a first process of generating, using a predetermined parameter (C+; C−; C) set related to a circuit structure including the servo driver (10) and the corresponding motor (20), a superimposed signal to be superimposed on the command signal, and the superimposed signal differs for each of control axes corresponding to the respective plurality of motors (20) when the command signal is in a low voltage range, and
the PWM calculator (55) performs a second process of generating the PWM control signal by adding the superimposed signal to the command signal and by comparing a resulting signal with a predetermined carrier signal.

The invention claimed is:

1. A servo system, comprising:
a control device; and
a plurality of servo drivers configured to synchronously control a plurality of motors based on a motion command from the control device, each of the plurality of servo drivers including
a servo signal generator configured to generate a command signal for a corresponding motor of the plurality of motors based on the motion command,
a PWM calculator configured to generate, based on the command signal generated by the servo signal generator, a PWM control signal with a pulse being modulated, where PWM is pulse width modulation, and
an inverter configured to generate a drive voltage to drive the corresponding motor by switching a switching element based on the PWM control signal generated by the PWM calculator,
wherein the PWM calculator performs a first process of generating, using a predetermined parameter set related to a circuit structure including the servo driver and the corresponding motor, a superimposed signal to be superimposed on the command signal, and the superimposed signal differs for each of control axes corresponding to the respective plurality of motors when the command signal is in a low voltage range, and
the PWM calculator performs a second process of generating the PWM control signal by adding the superimposed signal to the command signal and by comparing a resulting signal with a predetermined carrier signal.

2. The servo system according to claim 1, wherein the predetermined parameter is set based on a magnitude and a duration of switching noise in the inverter.

3. The servo system according to claim 1, wherein the predetermined parameter is set to have a different value for each of the control axes corresponding to the respective plurality of motors.

4. The servo system according to claim 1, wherein the PWM calculator performs the first process by adding a predetermined value to the superimposed signal, and the predetermined value is extracted through comparison of a value of the command signal corresponding to each phase of the corresponding motor with a value of the predetermined parameter, and is related to either one of the value of the command signal or the value of the predetermined parameter.

5. The servo system according to claim 4, wherein each of the plurality of motors is a three-phase alternating current motor, and
the PWM calculator extracts, in the first process, at least one of a maximum value or a minimum value of the value of the command signal corresponding to each phase of the corresponding motor and the value of the predetermined parameter, and sets a value related to the extracted value as the predetermined value.

6. The servo system according to claim 4, wherein each of the plurality of motors is a three-phase alternating current motor,
the PWM calculator generates, in the second process, the PWM control signal using a two-phase modulation method, and
the PWM calculator extracts, in the first process, a maximum value or a minimum value of the value of the command signal corresponding to each phase of the corresponding motor and the value of the predetermined parameter based on a magnitude of each of an absolute maximum value and an absolute minimum value of the command signal corresponding to each phase of the corresponding motor, and sets a value related to the extracted minimum value or the extracted maximum value as the predetermined value.

7. The servo system according to claim 4, wherein each of the plurality of motors is a three-phase alternating current motor,
the PWM calculator generates, in the second process, the PWM control signal using a two-phase modulation method, and
the PWM calculator extracts, in the first process, a maximum value or a minimum value of the value of the command signal corresponding to each phase of the corresponding motor and the value of the predetermined parameter based on a magnitude of each of an absolute maximum value and an absolute minimum value of the command signal corresponding to each phase of the corresponding motor and the predetermined parameter, and sets a value related to the extracted maximum value or the extracted minimum value as the predetermined value.

8. The servo system according to claim 4, wherein each of the plurality of motors is a three-phase alternating current motor,
the superimposed signal is a third harmonic wave of the command signal corresponding to each phase of the corresponding motor, and
the PWM calculator extracts, in the first process, a maximum value of a value of amplitude of the command signal corresponding to each phase of the corresponding motor and the value of the predetermined parameter, and sets a value related to the extracted maximum value as the predetermined value included in the third harmonic wave.

9. The servo system according to claim 1, wherein the predetermined parameter has a fixed value being invariable over time.

10. The servo system according to claim 1, wherein the predetermined parameter has a variable value being variable over time.

11. The servo system according to claim 1, wherein a value of the predetermined parameter is automatically determined based on circuit structures including the plurality of servo drivers and the plurality of motors connected to the control device.

* * * * *